UNITED STATES PATENT OFFICE.

EDWARD J. WALL, OF SYRACUSE, NEW YORK, ASSIGNOR TO KALMUS, COMSTOCK & WESCOTT, INCORPORATED, OF BOSTON, MASSACHUSETTS, A CORPORATION OF MASSACHUSETTS.

DYE RECOVERY.

1,303,426.  Specification of Letters Patent.  Patented May 13, 1919.

No Drawing.  Application filed May 18, 1917.  Serial No. 169,463.

*To all whom it may concern:*

Be it known that I, EDWARD J. WALL, a subject of the King of Great Britain, and resident of Syracuse, in the county of Onondaga and State of New York, have invented new and useful Improvements in Dye Recovery, of which the following is a specification.

This invention relates to the recovery of dye from dye solutions and more particularly to the recovery of dye from dye solutions used for color-sensitizing collodion or gelatin emulsions or other light responsive substances.

There have been two methods in common practice for sensitizing collodion and gelatin emulsions, viz., one in which the dye is added to the emulsion just before coating the same on the film or other support, and one in which the finished dry plate or film is bathed in an aqueous solution of the dye. The first method has been generally adopted in the commercial manufacture of color-sensitive plates and film, not on the basis of efficiency and effectiveness but because of its convenience. The second method affords results which are far superior with respect to color rendering, but it has not been extensively adopted commercially chiefly for the reason that it has been extremely wasteful and therefore costly.

Heretofore, in employing the second or bathing method it has been possible to use the dye solution for only a comparatively short time. As described in the application of Daniel F. Comstock and Edward J. Wall, Sr. No. 179,050, filed July 6, 1917, the dye solutions, which are of colloidal character, begin to precipitate the dye after a brief association with the photographic emulsions, and their sensitizing power rapidly diminishes. Moreover, even in the absence of precipitation the sensitizing power of the solutions gradually decreases owing to absorption of the dye by the emulsions. The addition of fresh dye to strengthen a dissipated solution is not feasible for the reason that the strength of the solution can not be kept sufficiently constant in this way, especially when the dye is composed of a plurality of components which are absorbed by the silver grain and gelatin in varying proportions. In order successfully to prolong the useful life of a dye solution by adding fresh dye, it is necessary continually to test the solutions spectrographically; and this is impractical. Consequently it has been the practice heretofore wholly to discard the solutions after a short period of use.

In the case of the triphenylmethane, phthalein or similar dyes, the rejection of used and partially exhausted baths is of no serious moment as these dyes are comparatively cheap. However, since the introduction of the isocyanin and similar dyes, which have proved to be vastly superior, this wastage of dye has rendered the bathing method practically prohibitive. And irrespective of the cost of the dye the bathing method has been exceedingly uneconomical inasmuch as only a relatively small portion of the dye content of the bathing solution has been used. The above mentioned prior application discloses a way in which the useful life of a dye solution can be greatly prolonged but in any event the solution becomes useless before the dye content is completely exhausted.

The objects of this invention are to recover the dye from partially spent solutions so that it may be employed in the preparation of other dye solutions and to recover the dye in substantially its original form so that it may be employed in the same way as fresh dye.

The present invention consists in precipitating in the dye solution an ingredient with which the dye will unite either physically, as by adsorption or absorption, or chemically, thereby to carry down the dye with the precipitated ingredient, and subsequently extracting the dye from the precipitate, as by dissolving the dye in alcohol, acetone, or other dye solvent. Any precipitate which will dissolve or otherwise take up the dye and which is insoluble in the solvent may be employed in my improved method. Examples of such ingredients are the hydroxid of aluminium, tin, iron, chromium, and other metallic hydroxids, but it is to be distinctly understood that these ingredients are only named by way of illustration and that other ingredients, such as other colloidal hydroxids, etc., may be employed. For example, barium sulfate may be employed to extract the dye from the solution, barium sulfate being insoluble in water and taking up the dye probably by adsorption.

Dye solutions comprising isocyanin or similar dyes, to which this invention is particularly applicable, are colloidal in character and hold the dye suspended in a finely divided state, the liquid employed thus to support the dye usually being water. The insoluble precipitate for extracting the minute particles of dye from the aqueous solution may be formed in any desired manner but the following are the best methods of which I am at present aware.

By adding to the dye solution a metallic salt and an alkali an insoluble metallic hydroxid is produced and by agitating this insoluble precipitate throughout the solution the dye particles are taken up thereby. After the dye has been adsorbed or absorbed by the colloidal hydroxid the precipitate may be separated from the solution in any desired manner, as by allowing it to settle so as to form a color lake. The precipitate or color lake is separated from the solution, is then preferably dried, after which it may be placed in alcohol or other dye solvent to dissolve the dye out from the precipitate. The solution thus obtained can either be evaporated to reduce the dye to a dry state or it may be diluted with water and used again for color-sensitizing.

Instead of forming the hydroxid precipitate, an inert substance such as barium sulfate may be precipitated in the dye solution by adding to the solution a soluble sulfate, such as ammonium, sodium or magnesium sulfate, together with a soluble barium salt, such as barium chlorid or barium nitrate. However, the best results are obtained by the use of the hydroxids by virtue of their great affinity for the dye.

It is known that tannin will precipitate basic dyes but tannin is not suitable for the present purpose as a tannin compound is soluble in alcohol and moreover it has a prejudicial effect upon photographic emulsions. Furthermore, I am aware that processes of manufacturing pigments for artists and printers, involving the formation of color lakes, are well-known in the art of dyeing and therefore I do not broadly claim the formation of color lakes.

I claim:

1. The method of recovering dye from a dye solution comprising precipitating in the dye solution an ingredient with which the dye will unite, thereby carrying down the dye with the ingredient, and subsequently extracting the dye from the ingredient.

2. The method of recovering dye from a dye solution comprising precipitating in the dye solution a precipitate which is insoluble in the solution but which will adsorb the dye, and subsequently dissolving the dye out from the precipitate.

3. The method of recovering dye from a dye solution comprising precipitating in the dye solution a metallic hydroxid which will form a color lake with the dye, separating the color lake from the solution, and subsequently dissolving the dye out from the color lake.

4. The method of recovering dye from a dye solution comprising precipitating in the dye solution an ingredient to which the dye will adhere, and subsequently extracting the dye from the ingredient.

Signed by me at Boston, Massachusetts, this fifteenth day of May, 1917.

EDWARD J. WALL.